United States Patent
Shibuya (10) Patent No.: US 6,184,784 B1
(45) Date of Patent: Feb. 6, 2001

(54) VEHICLE TRAVELING CONTROL DEVICE (75) Inventor: Toshihide Shibuya, Oyama (JP)

(73) Assignee: Komatsu Ltd., Tokyo (JP)

(*) Notice: Under 35 U.S.C. 154(b), the term of this patent shall be extended for 0 days.

(21) Appl. No.: 09/155,445

(22) PCT Filed: Mar. 27, 1997

(86) PCT No.: PCT/JP97/01046

§ 371 Date: Sep. 28, 1998

§ 102(e) Date: Sep. 28, 1998

(87) PCT Pub. No.: WO97/37117

PCT Pub. Date: Oct. 9, 1997

(30) Foreign Application Priority Data

Mar. 29, 1996 (JP) .................................................. 8-103913

(51) Int. Cl.[7] .............................................................. B60Q 1/00
(52) U.S. Cl. .......................................... 340/438; 180/167
(58) Field of Search ..................................... 340/438, 440; 180/167, 290

(56) References Cited

U.S. PATENT DOCUMENTS

| | | | |
|---|---|---|---|
| 3,718,792 | * | 2/1973 | Stagner ................................. 340/440 |
| 3,833,094 | * | 9/1974 | Grossman ............................. 340/438 |
| 3,891,964 | * | 6/1975 | Geiger .................................. 340/440 |
| 4,206,829 | * | 6/1980 | Melocik ................................ 180/290 |
| 4,458,234 | * | 7/1984 | Brisard ................................. 340/438 |
| 4,514,810 | | 4/1985 | Kariya et al. ........................ 364/424 |
| 4,744,239 | * | 5/1988 | Kyrtsos et al. ....................... 340/438 |
| 4,812,806 | * | 3/1989 | Freeman .............................. 340/440 |
| 5,070,959 | * | 12/1991 | Orabowski ........................... 180/167 |
| 5,531,122 | * | 7/1996 | Chatham et al. ..................... 340/438 |

FOREIGN PATENT DOCUMENTS

| | | |
|---|---|---|
| 59-2985 | 1/1984 | (JP) . |
| 63-64350 | 12/1988 | (JP) . |
| 2-147919 | 6/1990 | (JP) . |
| 3-28716 | 4/1991 | (JP) . |
| 4-15799 | 1/1992 | (JP) . |
| 4-38903 | 6/1992 | (JP) . |
| 6-58141 | 8/1994 | (JP) . |
| 7-6295 | 1/1995 | (JP) . |
| 7-192194 | 7/1995 | (JP) . |
| 8-72591 | 3/1996 | (JP) . |

* cited by examiner

Primary Examiner—Daniel J. Wu
Assistant Examiner—John Tweel, Jr.
(74) Attorney, Agent, or Firm—Sidley & Austin (57) ABSTRACT The present invention is a vehicle traveling control device, which can extend the life of a structure constituting a vehicle body. For this purpose, the traveling control device includes respective pressure sensors (22) for detecting pressures exerted on suspensions, a vehicle speed detector (33), a controller (10) for obtaining stress exerted on at least one of a frame (1), a vessel (41), front axles (42), and a rear axle (43) based on pressure detection values from the respective pressure sensors (22) and for issuing a deceleration instruction when the obtained stress is greater than a predetermined allowable value, and a speed control means (31) for inputting the deceleration instruction and controlling at least one of an engine fuel injection quantity, a transmission, and a braking device so that a detected value from the vehicle speed detector (33) equals an instruction speed of the deceleration instruction.

4 Claims, 7 Drawing Sheets

VEHICLE TRAVELING CONTROL DEVICE

TECHNICAL FIELD

The present invention relates to a vehicle traveling control device, which reduces the stress exerted on a structure constituting a body of a vehicle, such as a dump truck.

BACKGROUND ART

When a vehicle, such as a dump truck, travels on an uneven ground, a mismatch usually occurs as a result of the displacement of suspensions and tires, and structures constituting a vehicle body (for example, a frame, a vessel, a front axle, a rear axle, and the like) are sometimes put under an excessive load which impairs the durability thereof. When the structures constituting a vehicle body (hereinafter simply called "structures") are continuously subjected to such excessive load, stress accumulates in the structures, and the life of the structures sometimes ends earlier than their estimated life expectancy. For this reason, it takes considerable time to inspect the degree of fatigue in the aforesaid structures when performing regular maintenance.

In order to control the time for maintenance described above, there has been conventionally proposed a device for detecting the load exerted on a frame, for example, a distortion gauge which is directly placed on the frame, or a device for monitoring, for example, by measuring the inner pressure of suspensions which are mounted to a vehicle, and thereby detecting stress.

Figure 9:
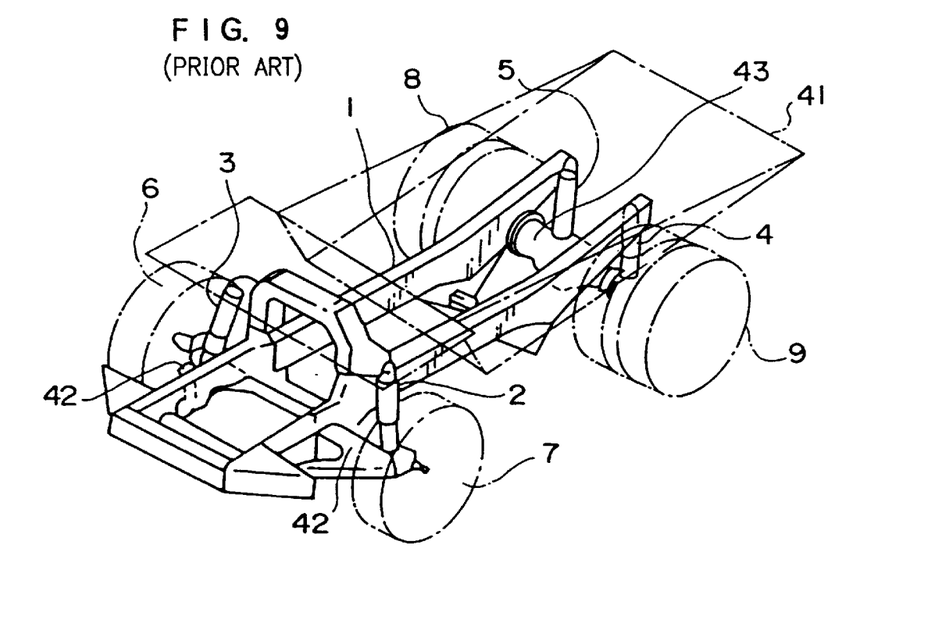
FIG. 9 is a perspective view showing an outline of a frame of the conventional working vehicle.

For example, Japanese Patent Application Publication No. 63-64350 discloses a monitoring device for detecting the inner pressure of gas-filled suspensions, and the explanation thereof will be made below with reference to FIGS. 9 to 11. FIG. 9 shows a schematic view of a frame to explain the monitoring device. As FIG. 9 shows, front axles 42 and 42 are provided at both sides of the front portion of a vehicle, and wheels 6 and 7 are attached via the front axles 42 and 42 to freely travel. A rear axle 43 is provided at a rear portion of the vehicle, and wheels 8 and 9 are attached via the rear axle 43 to freely travel. The front axles 42 and 42 are connected to the front portion of a frame 1 via suspensions 2 and 3, while the rear axle 43 is connected to the rear portion of the frame 1 via the suspensions 4 and 5. A vessel 41 is mounted on the top portion of the frame 1 to freely tilt rearwardly. The frame 1 is supported by the ground via the wheels 6, 7, 8, and 9 and the suspensions 2, 3, 4, and 5. The reaction forces F1, F2, F3, and F4 of the suspensions 2, 3, 4, and 5, respectively, are exerted on the frame 1, and these reaction forces cause stress a, which is expressed by a predetermined functional expression of the reaction forces F1, F2, F3, and F4, and is exerted on the frame 1. Each of the suspensions 2, 3, 4, and 5 is provided with a pressure sensor (not illustrated) for detecting the pressure exerted thereon.

Figure 10:
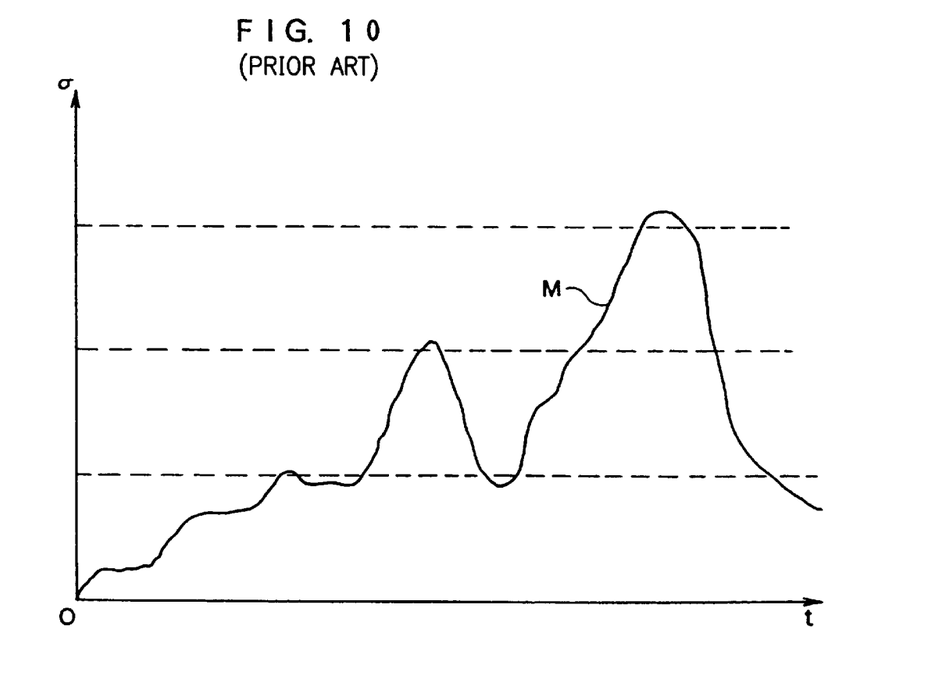
FIG. 10 is an example of a wave form of stress exerted on the frame, explaining the prior art.
Figure 11:
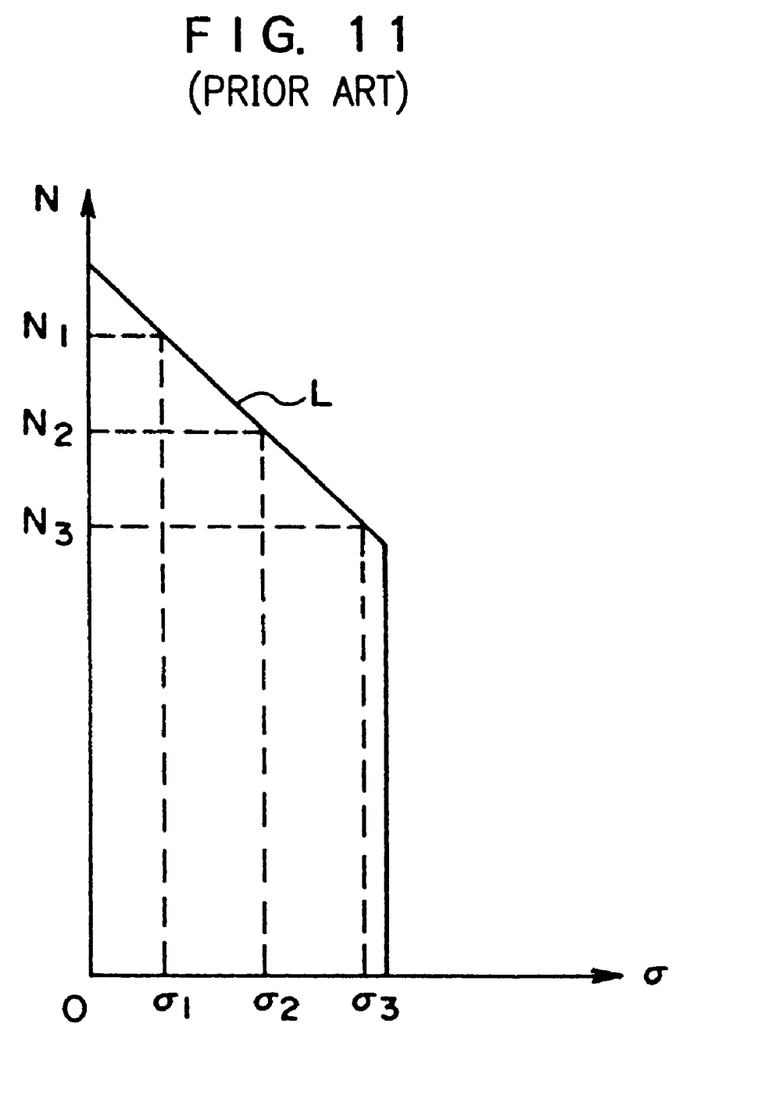
FIG. 11 is a control chart showing occurrence frequency limit of frame stress, explaining the prior art.

FIG. 10 shows an example of a wave form showing changes in the stress exerted on the frame 1 with respect to time, and FIG. 11 shows frame stress occurrence frequency limit. When a vehicle travels on a so-called uneven ground where the road surface is in a bad condition, the stress σ, as shown by a curved line M in FIG. 10, is exerted on the frame 1. A control limit line, which is based on the fatigue resistance of the frame 1 against the stress σ, is shown as the limit line L in the chart of the frame stress occurrence frequency limit illustrated in FIG. 11. FIG. 11 shows that a stress having a magnitude of, for example, $\sigma_1$ can be exerted on the frame 1 $N_1$ times before an abnormal condition occurs, but that when stress $\sigma_1$ is exerted thereon ($N_1$+1) times, some abnormal condition occurs to the frame 1. Here the stress $\sigma_1$ represents the upper limit of a normal value of stress exerted on the frame 1, stress $\sigma_3$ represents a stress close to the threshold value of stress exerted on the frame 1, and $\sigma_2$ represents an intermediate value between the stresses $\sigma_1$ and $\sigma_3$.

In the frame stress monitoring device, configured as described above, each pressure exerted on the suspensions 2, 3, 4, and 5, which is detected by means of a semiconductor sensor (not illustrated), is added at first in accordance with the aforesaid predetermined functional expression, and a stress detecting signal Sσ (not illustrated) is outputted. The stress detecting signal is held at each predetermined sampling cycle time, and the held signal is compared with each of the level signals of predetermined strength. The level signals are respectively set as level values corresponding to, for example the upper limit ($\sigma_1$) of the normal value of stress, stress ($\sigma_2$) close to the threshold value of stress, and the intermediate stress value ($\sigma_3$) between the upper limit ($\sigma_1$) and the threshold value ($\sigma_3$). Any one of the counters (not illustrated) is operated corresponding to the strength of the stress detecting signal Sσ, specifically, corresponding to each of the stress ranges $\sigma_1 < \text{or} \leq \sigma_2$, $\sigma_1 < \sigma \leq \sigma_3$ and $\sigma > \sigma_3$, at each of the aforesaid sampling cycle time. Accordingly, an enumerated value of each counter corresponds to the frequency with which stress in the corresponding stress range is exerted on the frame 1. Further, when the enumerated value in at least one of the aforesaid counters equals a previously set value, a light is lit.

As described above, it is detected when the frequency of occurrence of stress reaches the aforesaid control limit line L in FIG. 11, and an operator is informed of the time for maintenance of the frame 1. It should be noted that by using the monitoring device as described above, the operator can be informed of the time for maintenance of each of the other structures in the same way as the frame 1, based on the frequency of occurrence of stress.

As described above, the conventional monitoring device does not inform an operator of the occurrence of a higher load even when a higher load occurs, and it is not until the occurrence frequency reaches the control limit line L that the operator is informed of the occurrence as a warning. Accordingly, with the conventional monitoring device, the next time when passing an area, where a higher load has occurred, preventive measures, or the like, cannot be taken to prevent the occurrence of a higher load. The operator needs to remember the place in order to prevent the occurrence, and a disadvantage is that the higher load cannot be prevented from being exerted on the structures at the place once again if the operator forgets the place or doesn't notice it.

Further, when an operator travels in a new operation site for the first time, the operator has no idea of the road information until he or she actually travels in the site, and there is also a disadvantage in that the operators of the other vehicles operating in the same site cannot obtain information regarding the occurrence of a higher load until they travel in the place.

For this reason, the traveling frequency under high load is increased; therefore, the actual life of the structures is shorter than the expected life, and the number of times maintenance of the vehicle is performed increases. As a result, the cost for maintenance is increased, and the availability of a vehicle is decreased; therefore, it is desired to increase the life of the structures.

SUMMARY OF THE INVENTION

The present invention is to solve the above disadvantages of the prior art, and its object is to prevent a higher load from occurring to a structure constituting a vehicle body during traveling, and to provide a vehicle traveling control device which extends the life of a structure.

A first configuration of a vehicle traveling control device according to the present invention is a vehicle traveling control device in a vehicle including freely rotative wheels; front axles and a rear axle for supporting the wheels; suspensions for supporting and absorbing shock exerted on the front axles and the rear axle, a frame which is supported by the front axles, the rear axle, and the suspensions; and a vessel which is mounted on the top portion of the frame, and is characterized by including: respective pressure sensors for detecting pressures exerted on the suspensions; a vehicle speed detector for detecting vehicle speed; a controller for obtaining stress exerted on at least one of the following: the frame, the vessel, the front axles, and the rear axle based on pressure detection values of the respective pressure sensors, and outputting a deceleration instruction when the obtained stress is greater than a predetermined allowable value; and a speed control means for inputting the deceleration instruction, and controlling at least one of the following: engine fuel injection quantity, a transmission, and a braking device so that a detection value of the vehicle speed detector equals an instructed speed in the deceleration instruction.

According to the aforesaid configuration, the controller computes stresses exerted on the frame, the vessel, the front axles, and the rear axle which are structures constituting the vehicle body based on pressure exerted on each of the suspensions. The controller determines that a higher load is exerted on the aforesaid structures when the stress is greater than a predetermined allowable value. At this time, vehicle speed is decreased so that the higher load is not further exerted. Thereby the life of the structures constituting the vehicle body is extended.

Further, in the first configuration, the controller can be additionally provided with an alarm device for giving an alarm when the obtained stress is greater than a predetermined allowable value.

According to the above configuration, when a higher load occurs, the controller informs an operator of occurrence of a higher load by means of the alarm device. Thereby the operator is given an alarm; therefore, the operator recognizes the position where he or she has to decelerate to travel, and can decelerate when passing the same area once again. Thus the life of the structures is extended.

A second configuration of a vehicle traveling control device according to the present invention is a vehicle traveling control device in a vehicle including freely rotative wheels, front axles and a rear axle, suspensions, a frame, and a vessel, and is characterized by including: pressure sensors for detecting pressures exerted on the respective ones of suspensions; a vehicle speed detector for detecting vehicle speed; position detecting means for detecting the position of the vehicle; a controller for determining a stress exerted on at least one of the following: the frame, the vessel, the front axles, and the rear axle based on pressure detection values of the respective pressure sensors, inputting a vehicle position at the time of obtaining the stress from the position detecting means and storing the same when the obtained stress is greater than a predetermined allowable value, and outputting a deceleration instruction when thereafter passing the stored vehicle position; and a speed control means for inputting the deceleration instruction and controlling at least one of the following: an engine fuel injection quantity, a transmission, and a braking, device so that a detection value of the vehicle speed detector equals an instructed speed in the deceleration instruction.

According to the above configuration, the controller inputs from the position detecting means the position at the time of a higher load occurs and stores the same. When passing the same position once again, the vehicle is decelerated to less than a predetermined speed. Thereby, even when the operator forgets the position where a higher load has occurred, or when the operator tries to travel without decelerating, the vehicle can be surely decelerated. Thereby, the frequency with which a higher load occurs to the vehicle can be surely reduced; therefore, the life of the structures is extended.

Further, in the second configuration, a transmitter/receiver for transmitting and receiving position data to and from the other vehicles can be included, and the controller can transmit the vehicle position at the time of obtaining the stress to the other vehicles by means of the transmitter/receiver when inputting and storing the vehicle position at the time of obtaining the stress from the position detecting means (12, 13), and can receive vehicle positions of the other vehicles, in which stress greater than a predetermined allowable value is detected, by means of the transmitter/receiver and storing the same.

According to the above configuration, the controller stores the position when a higher load occurs, and transmits the positional information to other vehicles. Positions where a higher load occurs, which are detected in the other vehicles, are received by means of the transmitter/receiver, and these positions are stored. The controller decelerates the vehicle when passing the higher load occurring positions, which are detected in its vehicle and the other vehicle, once again. Thus, even when the operator travels a course which he or she has never traveled before, or even when the other vehicles, which have never passed a higher load occurring position, travel there, the vehicles are surely decelerated. As a result, higher load occurring frequency can be surely reduced.

A third configuration of vehicle traveling control device according to the present invention is a vehicle traveling control device in a vehicle including freely rotative wheels, front axles and a rear axle, suspensions, a frame, and a vessel, and is characterized by including: pressure sensors for detecting pressures exerted on respective ones of the suspensions; a vehicle speed detector for detecting vehicle speed; a controller for determining a stress exerted on at least one of the following: the frame, the vessel, the front axles, and the rear axle based on pressure detection values of the respective pressure sensors at each predetermined cycle time, determining which stress range out of predetermined stress ranges the obtained stress falls in, renewing a frequency value corresponding to the appropriate stress range, obtaining the product of a central stress value in each of the stress ranges and the frequency value at the central stress value, calculating the total amount of the obtained product in all of the stress ranges as damage quantity, and outputting a deceleration instruction when a load multiplying factor, which is calculated based on the damage quantity, is greater than a predetermined allowable value; and a speed control means for inputting the deceleration instruction, and controlling at least one of the following: an engine fuel injection quantity, a transmission, and a braking device so that a detection value of the vehicle speed detector equals an instructed speed in the deceleration instruction.

According to the above configuration, the controller determines a stress exerted on a structure such as a frame based on a pressure detection value of each of the pressure sensors, and renews occurrence frequency which is stored corresponding to each of the predetermined stress ranges in which the stress value falls. The controller obtains a product of a central stress value of each stress range and the occurrence frequency with the central stress value in each stress range, and calculates the total amount of these products as a damage quantity. The damage quantity represents the magnitude of load exerted on the structure, and it is shown that there is a possibility that when the damage quantity is greater than a predetermined allowable value, the life will end earlier than the expected life. Accordingly, in this case, the vehicle travels at a speed which is reduced to less than a prescribed speed. Thereby, the life can be returned to expected life; therefore, the life of structures can be extended.

A fourth configuration of a vehicle traveling control device according to the present invention is a vehicle traveling control device in a vehicle including freely rotative wheels, front axles and a rear axle, suspensions, a frame, and a vessel, and is characterized by including: pressure sensors for detecting pressures exerted on respective ones of the suspensions; a loading completion informing means for informing a loader side that a loadage weight reaches an allowable loadage weight value when a loading completion signal is inputted; and a controller for determining a stress exerted on at least one of the following: the frame, the vessel, the front axles, and the rear axle based on pressure detection values of the respective pressure sensors at each predetermined cycle time, determining which stress range out of predetermined stress ranges the obtained stress falls in, renewing a frequency value corresponding to the appropriate stress range, obtaining the product of a central stress value in each of the stress ranges and the frequency value at the central stress value, calculating the total amount of the obtained products in all of the stress ranges as a damage quantity, and decreasing the allowable loadage weight value, when a load multiplying factor, which is calculated based on the damage quantity, is greater than a predetermined allowable value, and outputting the loading completion signal to the loading completion informing means when the loadage weight, which is obtained based on pressure detection values of the respective pressure sensors, reaches the decreased allowable loadage weight value at the next loading time.

According to the above configuration, as in the aforesaid third configuration, the controller obtains a damage quantity based on the stress exerted on a structure and the occurrence frequency corresponding to each of predetermined stress ranges which the stress value falls in, and stores the same. When the damage quantity becomes greater than a predetermined allowable value, an allowable loadage weight value of load is decreased. When loadage weight at the next loading time reaches the allowable loadage weight value, the loading completion informing means informs a loader side of the completion of loading. At this time, the allowable loadage weight value is decreased as described above; therefore, actual loadage weight value is reduced compared to a usual value, and stress exerted on the structures becomes smaller. As a result, the life of the structures is extended.

BEST MODE FOR CARRYING OUT THE INVENTION

Preferred embodiments of the present invention will now be explained in detail below with reference to the drawings. The following description of the embodiments discloses examples of vehicle traveling control based on the load exerted on a frame 1 in the structures (for example, a frame 1, vessel 41, front axles 42, a rear axle 43, and the like) which constitutes a vehicle. However, the present invention is not intended to be limited to the above, and the vehicle traveling control can be performed based on load exerted on at least any one of the structures other than the frame 1.

Figure 1:
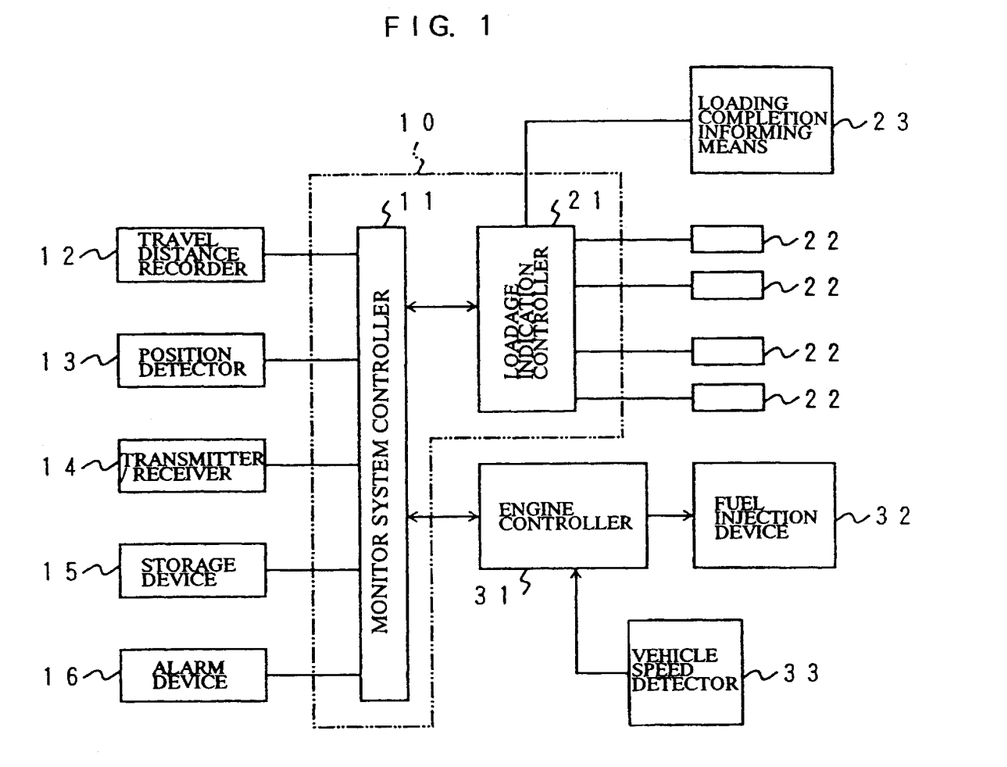
FIG. 1 is a block diagram of a configuration of hardware according to a first embodiment of the present invention.

FIG. 1 to FIG. 6 show a first embodiment, and FIG. 1 is a block diagram of a configuration of a hardware. A controller 10 comprises a monitor system controller 11 and a loadage indication controller 21, and includes, for example, a computer system with a microcomputer or the like as a main part. Four pressure sensors 22 and a loading completion informing means 23 are connected to the loadage indication controller 21. As in FIG. 9, the suspensions 2, 3, 4, and 5 are disposed at the portions between the frame 1 and the front wheels 6 and 7, and between the frame 1 and the rear wheels 8 and 9, and a respective pressure sensor 22 is attached at each of the suspensions 2, 3, 4, and 5. The suspensions 2, 3, 4, and 5 are gas-filled suspensions, which are filled with gas such as nitrogen gas, and purge valves are employed to adjust the strength or the like. Each of the pressure sensors 22 is a semiconductor pressure sensor for detecting the pressure exerted on the respective suspensions 2, 3, 4, or 5; and pressure sensing devices of the pressure sensors 22 are disposed at the aforesaid purge valves of the suspensions 2, 3, 4, and 5. It should be noted that as a pressure sensor 22 is not limited to a semiconductor pressure sensor, it can comprise a different pressure sensor.

The loadage indication controller 21 determines whether a vehicle is unladen (without a load) or laden (with a load), and performs processing for calculating the loadage weight value of the load, based on detection signals from the pressure sensors 22. For example, the output values of the pressure sensors 22 are stored when the vehicle is unladen, and based on the difference between these stored values and the detection values of the pressure sensors 22, an unladen/laden determination and a loadage weight value calculation can be carried out. The determination results, the loadage weight value, and a detection value of each of the pressure sensors 22 are outputted to the monitor system controller 11. When the aforesaid calculated loadage weight value reaches an allowable loadage weight value, the loadage indication controller 21 outputs a loading completion signal to the loading completion informing means 23 to inform a loader of the completion of loading. The loading completion informing means 23 comprises, for example, a horn, a lamp indicator, a wireless transmitter, or the like.

As an example of a position detecting means, a travel distance recorder 12 and a position detector 13 are provided. The travel distance recorder 12 detects the traveled distance of the vehicle, and outputs a distance detection value. Traveled distance is calculated from the number of pulse which is obtained by detecting the rotational frequency of, for example, a driving shaft (rear wheel) with a pulse generator. The position detector 13 detects the present position of the vehicle in a travel x-y coordinate system representing the entire travel road for the vehicle; and the position detector 13 comprises, for example, a detector for detecting the position in an absolute coordinate such as a GPS system, a detector for detecting the position as a relative position from a reference position based on the travel direction and the traveled distance of the vehicle, or the like. A position can be detected at predetermined times by using only the position detector 13 as a position detecting means. However, in this case, if the interval between the detecting times is shortened in order to increase the accuracy of the position, a computing processing load is exerted on the controller 10; therefore, in this embodiment, detection with the travel distance recorder 12 is used together for detection.

The monitor system controller 11 calculates stress exerted on the frame 1 based on a detection value from each of the pressure sensors 22, which is inputted from the loadage indication controller 21 to perform a predetermined determination processing. The monitor system controller 11 also inputs position coordinate data from the position detector 13 and a distance detection value from the travel distance recorder 12 to perform predetermined computation processing. Based on the determination and the computation results, the monitor system controller 11 outputs a speed instruction to an engine controller 31 to control speed, and transmits and receives position coordinate data to and from the other vehicles.

A transmitter/receiver 14 performs wireless transmission and reception of position coordinate data or the like to and from the other vehicles according to an instruction from the monitor system controller 11. A storage device 15 stores cumulative frequency distribution corresponding to each stress range of the frame 1 based on the aforesaid stress value which is calculated by the monitor system controller 11. The storage device 15 comprises a non-volatile memory, which can be, for example, battery backed C-MOS memory, flash memory, a hard disc, or the like. Further, an alarm device 16 sends an alarm to an operator based on an instruction from the monitor system controller 11, and comprises, for example, a buzzer or the like. The alarm device 16 is not limited to the above, and it can comprise a lamp indicator, a message indicator, or the like, which can call the operator's attention, or a combination of these indicators.

The engine controller 31 is one of the speed control means of the vehicle, and controls the engine speed based on a speed instruction from the monitor system controller 11. Specifically, the engine controller 31 controls a fuel injection device 32 so that the difference between a speed instruction value and a vehicle speed detection value from a vehicle speed detector 33 becomes smaller; and when a deceleration instruction is issued, the engine controller 31 outputs a control instruction to the fuel injection device 32 based on the speed instruction value. The fuel injection device 32 controls the fuel injection quantity for the engine based on the control instruction value to control the engine speed. The vehicle speed detector 33 detects the vehicle speed; and the vehicle speed is detected by detecting, for example, the rotations of the driving shaft per unit time with a pulse generator or the like. The speed control means is not limited to the engine controller 31, and at least any one of, for example, a transmission controller for controlling a transmission, a brake controller for controlling a brake, and the engine controller 31 can be used.

Figure 2:
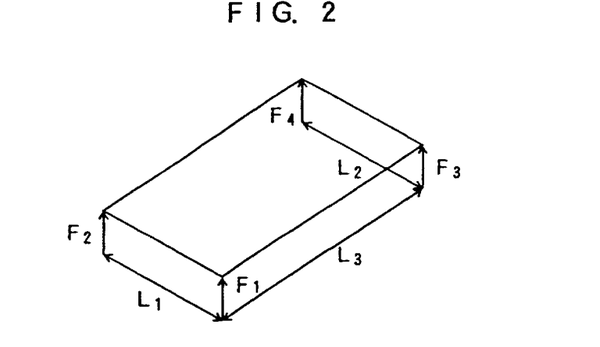
FIG. 2 is an analytic model of stress exerted on a frame according to the first embodiment of the present invention.

FIG. 2 shows an analytical model of the stress exerted on the frame 1 according to the first embodiment, and here F1, F2, F3, and F4 represent loads which are obtained from the pressure values detected by respective pressure sensors 22. At this time, the stress exerted on the frame 1 by each load is expressed by the following mathematical expressions.

$$T = K1[L1(F1-F2) - L2(F3-F4)] \quad (1)$$

$$W = K2[L1(F1-F2) + L2(F3-F4)] \quad (2)$$

$$U = K3 \times L3[(F1+F2) - (F3+F4)] \quad (3)$$

Here, respective coefficients L1, L2, and L3 represent the lengths of the frame 1 between the suspensions 2 and 3, between the suspensions 4 and 5, and between the suspensions 2 and 4. Each of coefficients K1, K2, and K3 is a specified constant based on the structure, quality of material, and the like of the frame 1. Stresses T, W, and U, respectively, correspond to stresses occurring when the frame 1 is twisted (the phase of sway in a lateral direction of the frame 1 is different at the front and rear portions), when it is rolled (the phase of sway in a lateral direction of the frame 1 is the same at the front portion as at the rear portion), and when it is bent (the sway in a longitudinal direction of the frame 1).

Figure 3:
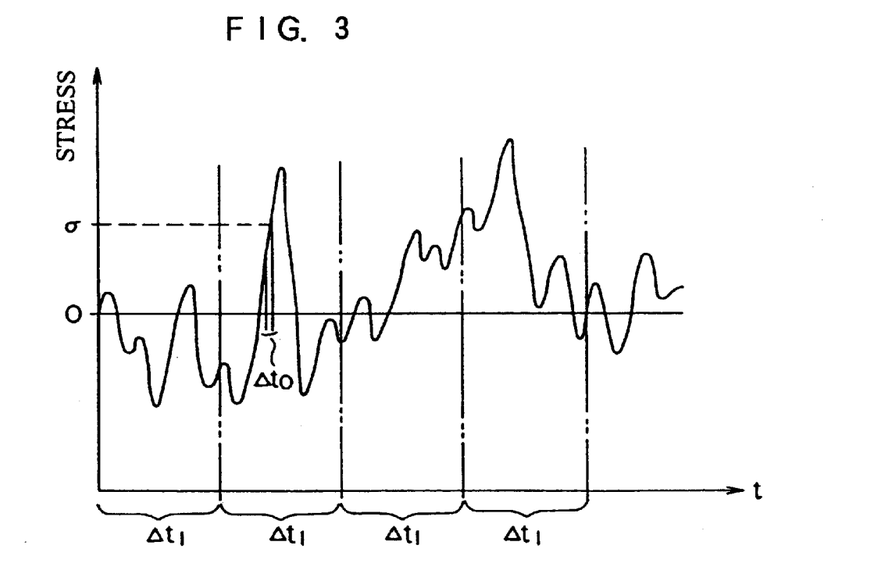
FIG. 3 is an example of a wave form of stress exerted on the frame according to the first embodiment of the present invention.
Figure 4:
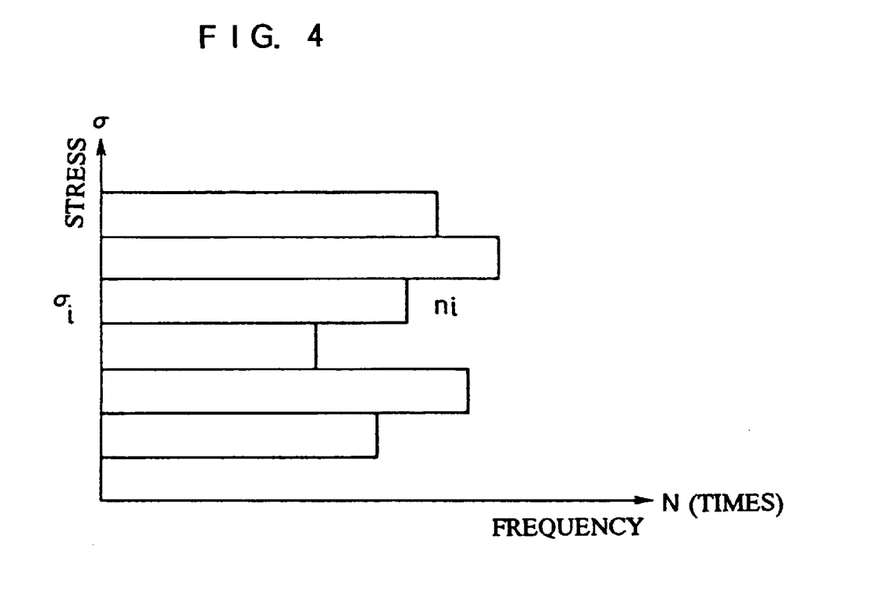
FIG. 4 is occurrence frequency distribution of stress exerted on the frame according to the first embodiment of the present invention.

FIG. 3 shows an example of a wave form of stresses T, W, and U which are actually measured, and FIG. 4 shows a frequency distribution when sampling stress wave forms in time sequence. The monitor system controller 11 inputs a detection value of each of the pressure sensors 22 from the loadage indication controller 21 at each predetermined cycle time Δt0, and based on the pressure detection value, each of the stresses T, W, and U which is exerted on the frame 1 is calculated from the aforesaid expressions (1) to (3). Each of the calculated stress values corresponds to a sampling stress value σ at each predetermined time Δt0. When plotted in time sequence, the sampling stress value σ is as the wave form shown in FIG. 3. Meanwhile, in the measurement range of a stress value, several stress ranges which are divided at predetermined intervals are set as shown in FIG. 4, and the frequency value N with which stress within the range occurs is stored corresponding to each stress range. The monitor system controller 11 determines which stress range the sampling value a falls in for each of the stresses T, W, and U, and the aforesaid frequency value corresponding to the appropriate range is calculated every time a measurement is carried out.

The processing to obtain the aforesaid frequency distribution is actually performed as follows. A stress value is calculated at each predetermined time Δt0, and the stress value is stored in a predetermined storage area of the storage device 15 in time sequence. When the storage value is accumulated in a predetermined time Δt1 (Δt1>Δt0), rain flow frequency analysis, which is one of the so-called statistical analytical methods, is carried out for the stress data (this corresponds to stress wave form value) accumulated in the time Δt1. By the rain flow frequency analysis, the frequency distribution for the stress, which is detected in time Δt1, is obtained.

For the frequency distribution of each stress value as in FIG. 4, a damage quantity D is defined which is expressed by the following expression (4).

$$D = \sum_{i}^{m} (\sigma i)^m ni \quad (4)$$

Here, σi represents a central value of each of the stress ranges, in represents a frequency value in the stress range corresponding to σi, m represents a coefficient which is specified according to the structure of the frame 1, and M represents the number of divisions of the stress range. Though it is preferable that the number of divisions M is larger, since the computation accuracy of the damage D is increased, the number is determined depending on the relationship with the computing ability of a computer. The damage quantity D corresponds to the enumerated value of stress which is exerted on the frame 1 in the predetermined time Δt1. An equivalent load Feq is obtained from the damage quantity D from the following expression (5); further, a load multiplying factor S for a reference load $F_0$ of the equivalent load Feq is obtained from the expression (6). The life expectancy of the frame 1 is estimated based on the load multiplying factor S.

$$Feq=(D/N_0)^{1/m} \quad (5)$$

$$S=Feq/F_0 \quad (6)$$

Here, $F_0$ is a reference load when the expected life period of the frame 1, which is used in a previously expected way, is infinite, and $F_0$ is a constant which is specified according to the structure, materials, or the like of the frame 1. $N_0$ is a reference occurrence frequency with which the aforesaid reference load $F_0$ occurs per predetermined time Δt1, which satisfies the expected life period when the frame 1 is used in a previously expected way, and this can be obtained empirically. Accordingly, when the equivalent load Feq occurs $N_0$ times per predetermined time Δt1, it is considered to be equivalent to the case in that the damage quantity D added. When the equivalent load Feq, which is greater than predetermined times of the reference load $F_0$, is continuously exerted on the frame 1, it is expected that the life will end earlier than the aforesaid expected life. Specifically, in a situation where the aforesaid load multiplying factor S is more than the predetermined value, it is determined that there is a possibility that the life of the frame 1 will end earlier than the expected life. The above processing is performed for each of the stresses T, W, and U.

Figure 5:
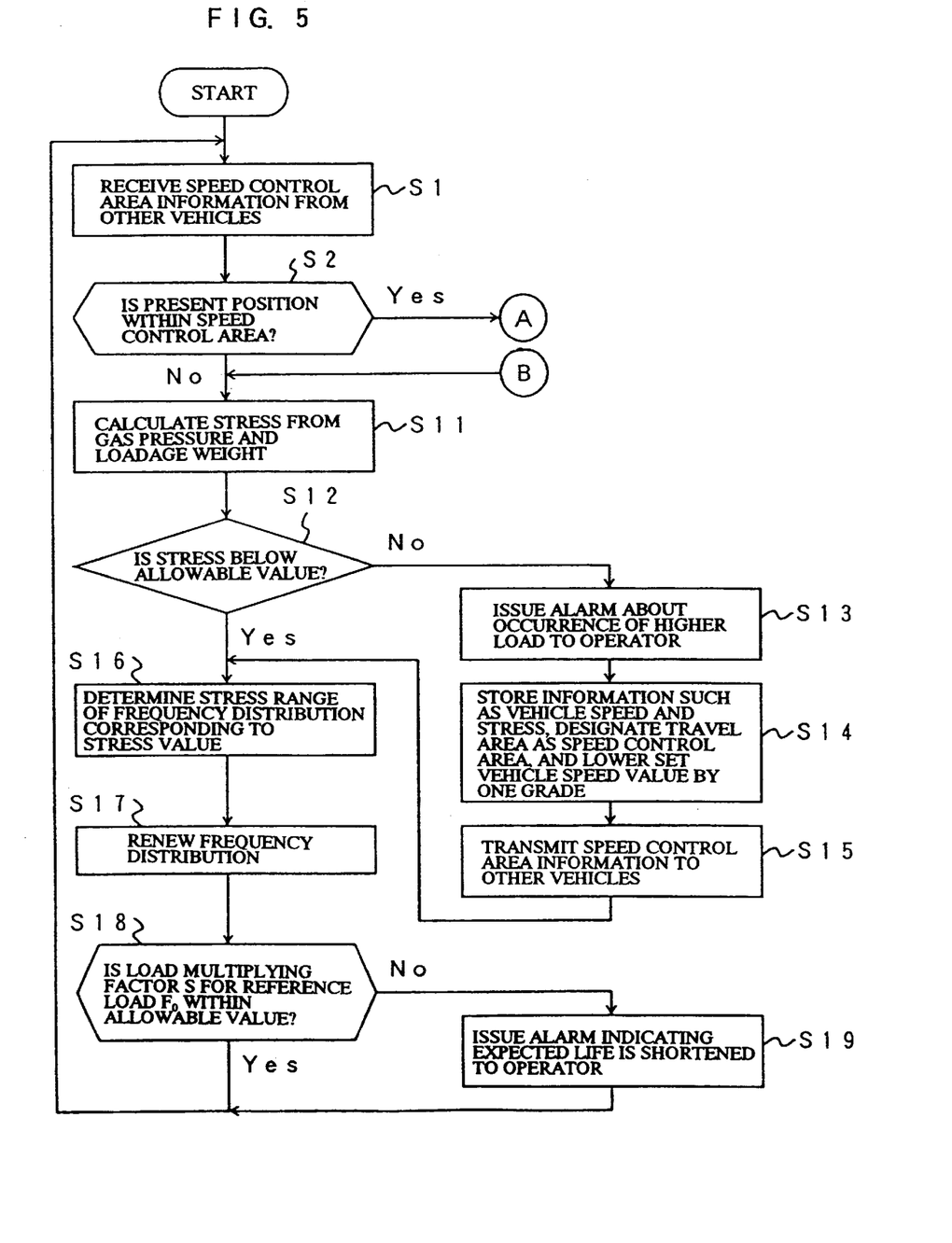
FIG. 5 is part of a flowchart of processing according to the first embodiment of the present invention.
Figure 6:
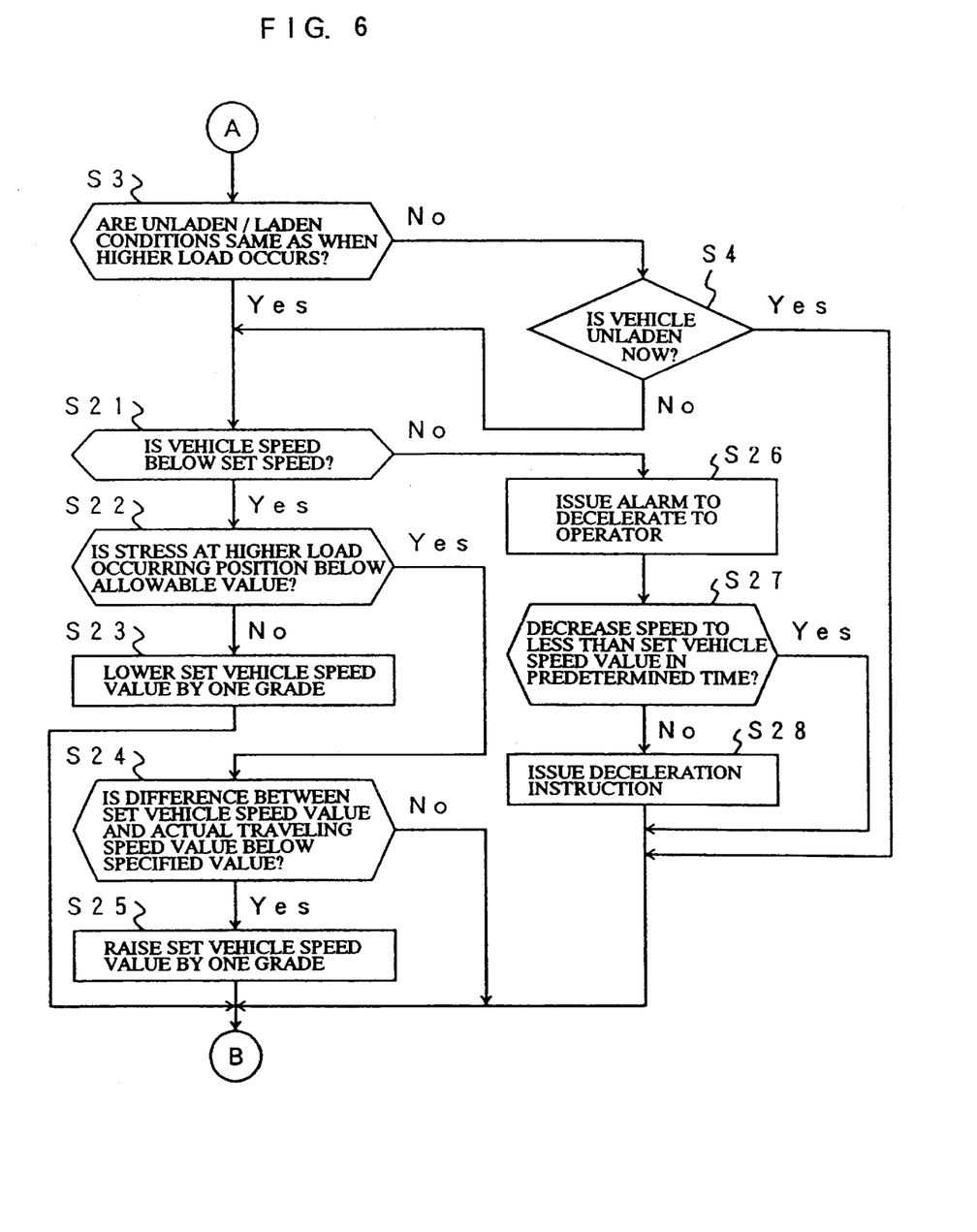
FIG. 6 is a flowchart of processing continuing from FIG. 5.

Next, the operation will be explained based on the flowcharts of the embodiment shown in FIGS. 5 and 6. These flowcharts show the processing of the controller 10. It should be noted that each step number is shown with a preceding "S", for example, "Step 1" is shown as "S1".

Information of a vehicle speed control area is received from the other vehicles (S1). Here, a vehicle speed control area is an area between the position where a higher load occurs and a position which is a predetermined distance away from and before that position. Next, the present position of the vehicle is calculated based on the position data inputted from the position detector 13 and the traveled distance data inputted from the travel distance recorder 12, and it is determined whether or not the present position is within the vehicle speed control area (S2). When it is not within the vehicle control area, the stress which is exerted on the frame 1 at present is calculated based on a gas pressure and a loadage weight value of each of the suspensions 2, 3, 4, and 5 (S11). It is determined whether or not the calculated stress is less than an allowable value (S12), and if not, an alarm instruction is outputted to the alarm device 16 to inform the operator that a higher load occurs (S13). The stress value, the vehicle speed value, the loadage weight value, the information discriminating the vehicle between unladen and laden, and the course position are stored in the storage device 15 when a higher load occurs; a predetermined area including this position is stored as a vehicle speed control area; and a vehicle speed set value in this area is lowered by one grade (S14). Further, the information regarding the vehicle speed control area is transmitted to the other vehicles by means of the transmitter/receiver 14 (S15), and then a command is given to proceed to S16. In S12, when the calculated stress is less than the allowable value, a command is given to proceed to S16.

In S16, in the frequency distribution of stress, the stress range corresponding to the stress value calculated in S11 is determined. The frequency distribution is renewed by adding 1 to a frequency value corresponding to the appropriate stress range (S17). In the processing in S16 and S17, the frequency distribution in the predetermined time Δt1 is obtained by rain flow frequency analysis as described above, and renewed. Next, the damage quantity D, the equivalent load Feq, and the load multiplying factor S at present are calculated for the renewed frequency distribution based on the aforesaid expressions (4) to (6), and it is determined whether or not the load multiplying factor S is within a predetermined allowable value (S18). When it is within the allowable value, a command is given to return to SI and the processing is repeated. When it is not within the allowable value, an alarm instruction is outputted to the alarm device 16 to inform the operator of the possibility that the life will end earlier than the expected life of the frame 1 when used in an expected way (S19). A command is given to return to S1 to repeat the processing.

When the present position is within the vehicle speed control area in S2, it is determined whether the conditions of the unladen/laden vehicle at present is the same as the condition where a higher load occurs (S3). If the condition is the same, in order to control the vehicle speed, it is determined whether or not the actual vehicle speed value is less than a set vehicle speed value (S21). If it is not less than the set vehicle speed value, an alarm instruction is outputted to the alarm device 16 to urge the operator to decrease the speed to less than the set vehicle speed value (S26). It is monitored whether or not the actual traveling vehicle speed value is decreased to less than the set vehicle speed value in a predetermined time (S27), and if it has not decreased sufficiently, a deceleration instruction is outputted to the engine controller 31 to compulsorily decelerate the vehicle (S28). Next, a command is given to proceed to the processing in the aforesaid S11, and the processing is repeated from then on. When the speed value is less than the set vehicle speed value in S27, a command is given to proceed to S11, and the processing is repeated from then on.

When the speed value is less than the set vehicle speed value in S21, it is determined whether or not the stress at this time, which occurs when traveling the position where a higher load occurs after passing the vehicle speed control area, is less than the allowable value (S22), and if not, it is considered that the set vehicle speed value has not been lowered enough; therefore, the set vehicle speed value is lowered by one grade (S23). In this way, the speed is controlled so that the stress occurring is less than the allowable value; therefore, the damage quantity is gradually decreased at less than the predetermined allowable value relative to the operation time. Next, a command is given to proceed to the aforesaid processing in S11, and the processing is repeated from then on.

In S22, when the stress this time is less than the allowable value, it is determined whether or not the difference between the set vehicle speed value and the actual traveling vehicle speed value is less than a prescribed value (S24), and if it is less than the prescribed value, the set vehicle speed value is raised by one grade (S25). This is because the irregularities of the road, where a higher load has occurred before, are determined to be repaired when the actual traveling vehicle speed value is close to the set vehicle speed value; and when a smaller stress occurs, the speed is gradually increased since there is a possibility that the set vehicle speed value can be returned to the original specified value. It should be noted that when the vehicle speed difference is greater than the prescribed value, it is considered that the irregularities of the road have not been repaired, and a command is given to proceed to the processing in S11, and the processing is repeated from then on.

In S3, when the present condition of unladen/laden vehicle is not the same as the condition under which a higher load occurs, it is determined whether or not the vehicle is unladen at present (S4), and if it is not unladen, a command is given to proceed to S21 to control the vehicle speed to perform the aforesaid processing after S21. In S4, when it is unladen, a command is given to proceed to the processing in S11, and the processing is repeated from then on.

It should be noted that when the load multiplying factor S is not within the predetermined allowable value in S18, the allowable loadage weight can be lowered to a predetermined value smaller than the prescribed value in S19. In this case, at the next loading time, when the loadage weight reaches the reduced allowable loadage weight, the controller 10 outputs a loadage completion signal to the loadage completion informing means 23. Thereby, the loadage weight can be smaller than a normal value, and the stress occurring can be smaller than the previous occurrence value. When the load multiplying factor S is returned to less than the predetermined allowable value in S18, the allowable loadage amount is returned to the original prescribed value. As a result, the magnitude of stress can be controlled so that the damage quantity is always at an allowable value level relative to the operation time, specifically, so that the load exerted on the frame 1 becomes such a load as fulfills the predetermined expected life of the frame 1.

As described above, when a stress greater than an allowable value occurs while traveling, an operator's attention is called, and at the same time, the stress value, the vehicle speed value, the loadage weight value, information discriminating the vehicle between unladen and laden, and the course position are stored. Further, the same information is also transmitted to the other vehicles, and similar information of the other vehicles is received. Based on the information, when passing the same area next time, the operator is urged to decelerate while passing so that the stress is less than an allowable value, and if the operator does not decelerate, the vehicle is compulsorily decelerated while traveling. Accordingly, the other vehicles passing the area for the first time can also decrease the speed to less than the allowable value while traveling. Thereby the frame is prevented from being continuously under a higher load.

The stress frequency distribution is renewed in order based on the aforesaid stored stress value, and according to the stress frequency distribution, the damage quantity exerted on the frame, the equivalent load, and the load multiplying factor at each point in time are computed. When it is determined that the life expectancy predicted from the load multiplying factor is shorter than a predetermined expected life, an alarm is sent to an operator to decrease the vehicle speed, or to reduce the loadage to travel. Thereby the damage quantity of the frame 1 can be decreased to less than an allowable value, and the life of the frame is extended so as to complete the expected life period.

The damage quantity can be reduced for at least any one of the other structures, for example, the vessel 41, the front axle 42, the rear axle 43, and the like as in the above description, instead of being limited to the frame 1; thereby the expected life period of each one can be completed. In this case, the stress exerted on the aforesaid structures is expressed by the same expressions as the aforesaid expressions (1) to (3). Here, each of the coefficients K1, K2, and K3 is a constant which is specified according to the structure, materials, and the like of the vessel 41, the front axles 42, the rear axle 43, and the like.

Figure 7:
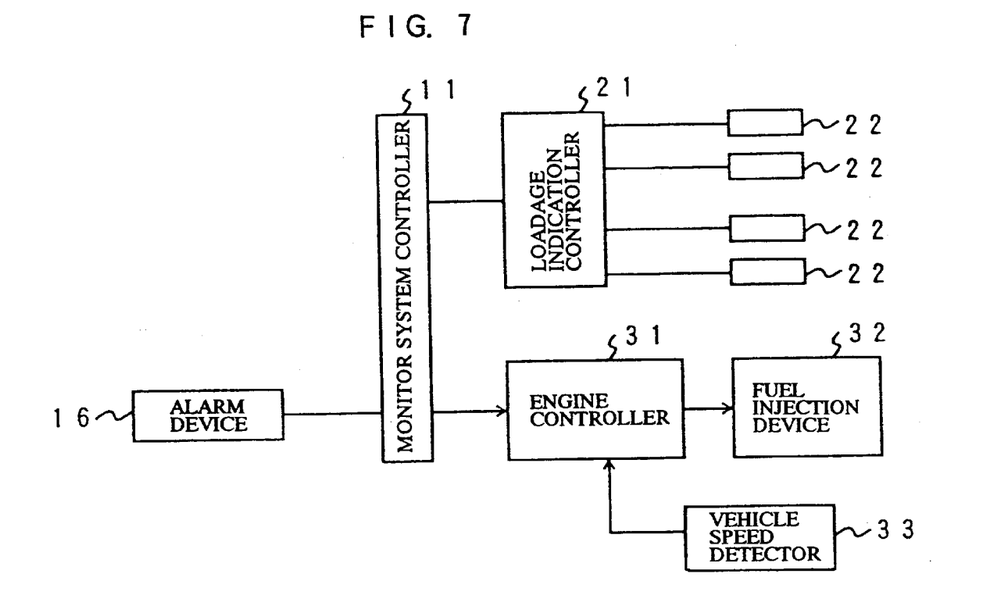
FIG. 7 is a block diagram of a configuration of hardware according to a second embodiment of the present invention.
Figure 8:
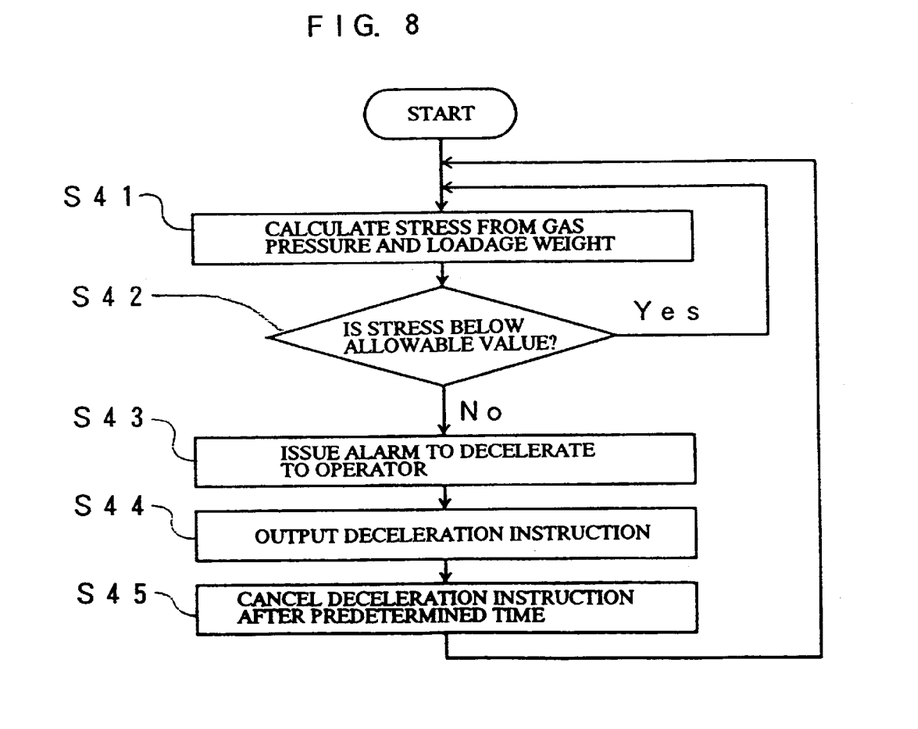
FIG. 8 is a flowchart of processing according to the second embodiment of the present invention.

Next, a second embodiment is explained based on FIGS. 7 and 8.

The second embodiment is an example in which a vehicle is instantly decelerated on the spot when an occurrence of a higher load is detected, and FIG. 7 shows a block diagram of the configuration of the hardware. Here, the same numerals are affixed to the same elements as those in the first embodiment in FIG. 1, and as seen from FIG. 7, the second embodiment is composed of only some of the parts in FIG. 1.

FIG. 8 shows a flowchart of processing, and the explanation will be made with reference to the same flowchart hereinafter. Based on the respective gas pressure values and loadage weight values of the suspensions 2, 3, 4, and 5, which are inputted from the loadage indication controller 21, the damage quantity and the stress exerted on the frame 1 at present are calculated (S41). It is determined whether or not the calculated stress is less than an allowable value (S42). If it is less than the allowable value, a command is given to return to S41 to repeat the processing. If not, an alarm instruction is outputted to the alarm device 16 to inform an operator of an occurrence of a higher load and to urge the operator to decrease the speed to less than a prescribed vehicle speed value (S43). Next, a deceleration instruction is outputted to the engine controller 31 to compulsorily decelerate the vehicle (S44), and after a predetermined time, the deceleration instruction is canceled to return to the original specified vehicle speed value (S45). A command is given to return to S41 to repeat the processing.

As described above, when a stress greater than an allowable value occurs during traveling, an operator is urged to decrease the speed to less than a prescribed vehicle speed value, and the vehicle speed is compulsorily decreased; therefore the frame 1 is prevented from continuously being under a higher load. Thus the damage quantity of the frame 1 is decreased, and the life of the frame 1 is extended. It should be noted that the damage quantity can be also decreased for at least any one of the other structures, for example, the vessel 41, the front axles 42, the rear axle 43, and the like in the second embodiment instead of being limited to the frame 1, and the life of each structure is increased.

INDUSTRIAL AVAILABILITY

The present invention is useful as a travel control device for a vehicle, which prevents a higher load from occurring to a structure constituting a vehicle body during traveling, and which increases the life of the structure.

What is claimed is:

1. A vehicle traveling control device in a vehicle including freely rotative wheels; front axles and a rear axle for supporting said wheels; suspensions for supporting and absorbing shock exerted on said front axles and said rear axle; a frame which is supported by said front axles, said rear axle, and said suspensions; and a vessel which is mounted on a top portion of said frame; said vehicle traveling control device comprising:

pressure sensors for detecting pressures exerted on respective ones of said suspensions;

a vehicle speed detector for detecting vehicle speed;

position detecting means for detecting a position of the vehicle;

a controller for determining a stress exerted on at least one of the following: said frame, said vessel, said front axles, and said rear axle, based on pressure detection values of respective ones of said pressure sensors, for inputting a vehicle position from said position detecting means at a time of determining said stress and for storing the inputted vehicle position when said determined stress is greater than a predetermined allowable value, and for outputting a deceleration instruction when thereafter passing a thus stored vehicle position; and a speed control means for inputting said deceleration instruction, and for controlling at least one of the following: engine fuel injection quantity, a transmission, and a braking device, so that a detection value from said vehicle speed detector equals an instructed speed in said deceleration instruction.

2. A vehicle traveling control device in accordance with claim 1, further comprising:

a transmitter/receiver for transmitting and receiving position data to and from other vehicles, said controller transmitting the vehicle position, at the time of determining said stress, to the other vehicles by means of said transmitter/receiver when inputting and storing the vehicle position from said position detecting means at the time of determining said stress, and said controller receiving vehicle positions from said other vehicles, in which a stress greater than a predetermined allowable value is detected, by means of said transmitter/receiver and storing thus received vehicle positions.

3. A vehicle traveling control device in a vehicle including freely rotative wheels; front axles and a rear axle for supporting said wheels; suspensions for supporting and absorbing shock exerted on said front axles and said rear axle; a frame which is supported by said front axles, said rear axle, and said suspensions; and a vessel which is mounted on a top portion of said frame; said vehicle traveling control device comprising:

pressure sensors for detecting pressures exerted on respective ones of said suspensions at predetermined cycle times;

a vehicle speed detector for detecting vehicle speed;

a controller for determining a stress exerted on at least one of the following: said frame, said vessel, said front axles, and said rear axle, based on pressure detection values from respective ones of said pressure sensors at each of said predetermined cycle times, for determining which stress range out of predetermined stress ranges the thus determined stress falls in, for renewing a frequency value corresponding to the thus determined stress range, for obtaining for each stress range a product of a central stress value in a respective one of said stress ranges and a frequency value at the respective central stress value, for calculating a total amount of the thus obtained products in all of the stress ranges as a damage quantity, and for outputting a deceleration instruction when a load multiplying factor, which is calculated based on said damage quantity, is greater than a predetermined allowable value; and a speed control means for inputting said deceleration instruction, and for controlling at least one of the following: engine fuel injection quantity, a transmission, and a braking device, so that a detection value from said vehicle speed detector equals an instructed speed in said deceleration instruction.

4. A vehicle traveling control device in a vehicle including freely rotative wheels; front axles and a rear axle for supporting said wheels; suspensions for absorbing and supporting shock exerted on said front axles and said rear axle; a frame which is supported by said front axles, said rear axle and said suspensions; and a vessel which is mounted on a top portion of said frame; said vehicle traveling control device comprising:

pressure sensors for detecting pressures exerted on respective ones of said suspensions at predetermined cycle times;

a loading completion informing means for informing a loader side that loadage weight reaches an allowable loadage weight value when a loading completion signal is inputted; and a controller for determining a stress exerted on at least one of the following: said frame, said vessel, said front axles, and said rear axle, based on pressure detection values from respective ones of said pressure sensors at each of said predetermined cycle times, for determining which stress range out of predetermined stress ranges the thus determined stress falls in, for renewing a frequency value corresponding to the thus determined stress range, for obtaining for each stress range a product of a central stress value in a respective one of said stress ranges and a frequency value at the respective central stress value, for calculating a total amount of the thus obtained products in all of the stress ranges as a damage quantity, for decreasing said allowable loadage weight value when a load multiplying factor, which is calculated based on said damage quantity, is greater than a predetermined allowable value, and for outputting the loading completion signal to said loading completion informing means when a loadage weight, which is obtained based on pressure detection values of said pressure sensors, reaches said decreased allowable loadage weight value at a next loading time.

* * * * *